Patented Dec. 12, 1950

2,533,833

UNITED STATES PATENT OFFICE 2,533,833

OPPOSED HYDRAULIC RAM POWER TRANSMISSION, INCLUDING HYDRAULICALLY OPERATED POWER TRANSMISSION STOP

Carl W. Mott, La Grange, Ill., assignor to International Harvester Company, a corporation of New Jersey Application August 10, 1946, Serial No. 689,770

2 Claims. (Cl. 60—52)

This invention concerns a hydraulic power transmission system and particularly such a system that is adapted for use as a power lift device upon tractors or the like.

One of the objects of this invention is the provision of complementary operable one-way operating hydraulic ram devices for controlling two-way movement and the pivotal position of a pivotable structure such as a rock-shaft upon a tractor.

The invention also contemplates and has for one of its objects the provision of a hydraulic ram stop device settable to limit movement of the plunger of one of the above referred to hydraulic ram devices, and being operable complementary with the other of such devices and through the plunger of the one device to effect two-way setting of such stop device.

Another object is the provision of hydraulic control circuits for some of the valves of the hydraulic system, enabling these valves to be of the poppet type and remotely controlled.

These and other desirable objects inherent in and encompassed by the invention will be more fully understood from the ensuing description and the annexed drawings, wherein.

Figure 1:
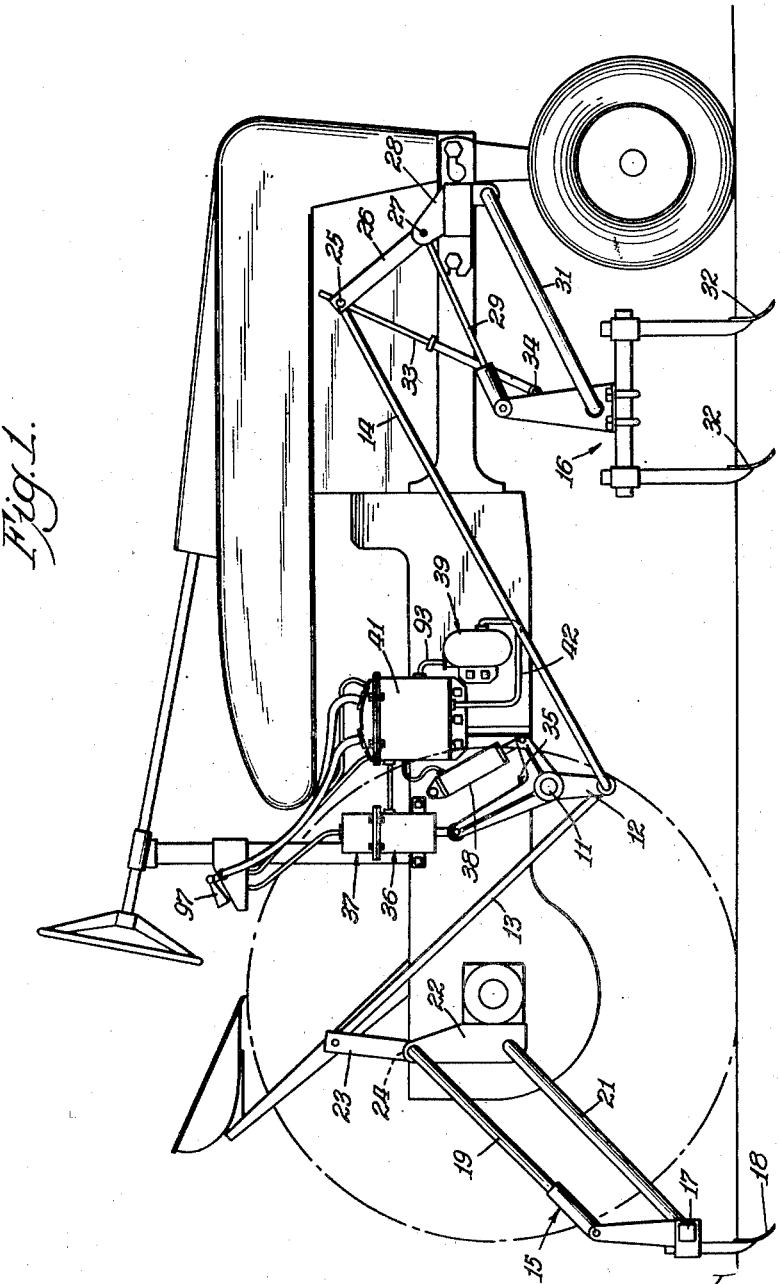
Fig. 1 is a side elevational view of a farm tractor having the nearest of its rear traction wheels removed, together with a hydraulic power transmission system embodying a preferred form of the invention mounted on said tractor.

The auxiliary power transmitting apparatus is mounted on the mid-section of the tractor and is employed for controlling the rotative position of a rock-shaft 11. The rock-shaft in turn is operable through a depending arm 12 and links 13 and 14 for controlling the elevation of rear and forward tool rigs 15 and 16.

The rear tool rig 15 includes a tool bar 17 to which tools 18 are attached, and the rig includes parallel bars 19 and 21 pivotally connected at their upper ends to a bracket 22 whereby an upright position of the tool 18 is maintained when the parallel bars are swung about their pivots for varying the elevation of the tool between an operating lowered position and a transport position. An arm 23, rigidly connected with a laterally turned upper end portion 24 of the rod 19, is swingable coaxially with the laterally turned portion for effecting depth adjustment of the tool and movement of the tool between the working and transport positions. Counter-clockwise rotation of the rock-shaft 11 and of the arm 12 will cause the link 13 to be moved endwise downwardly and forwardly for pivoting the arm 23 clockwise and causing upward movement of the tool 18. Similar manipulation of the tool rig 16 is effected by the link 14 which is pivotally connected at 25 to an arm 26 pivotally connected at 27 to a bracket 28 on a forward portion of the tractor frame. Parallel rods or links 29 and 31, corresponding to the links 19 and 21 at the rear of the tractor, are pivotally supported at their forward ends in the bracket 28 and predetermine the path of movement and maintain the upright position of the tools 32 when the rig 16 is raised or lowered. The arm 26 determines the path of movement of the pivotal connection element 25 whereas the lifting and lowering of the rig 16 is effected by a lifting and hold-down structure 33 connected with the element 25 and pivotally connected with the rig at 34.

It will also be noted that counter-clockwise movement of the rock-shaft 11 and of the arm 12 also causes upward movement of the tools 32 by projecting the link 14 endwise forwardly and consequent upward movement of the structure 33.

The rock-shaft 11 together with the arm 12 and a bell-crank 35 forms a pivotable structure, and the rotational position of this structure is controlled and effected by hydraulic ram devices 36, 37, and 38. Fluid for the operation or energization of these ram devices is circulated by a gear pump 39 which is constantly driven by the tractor engine.

Figure 2:
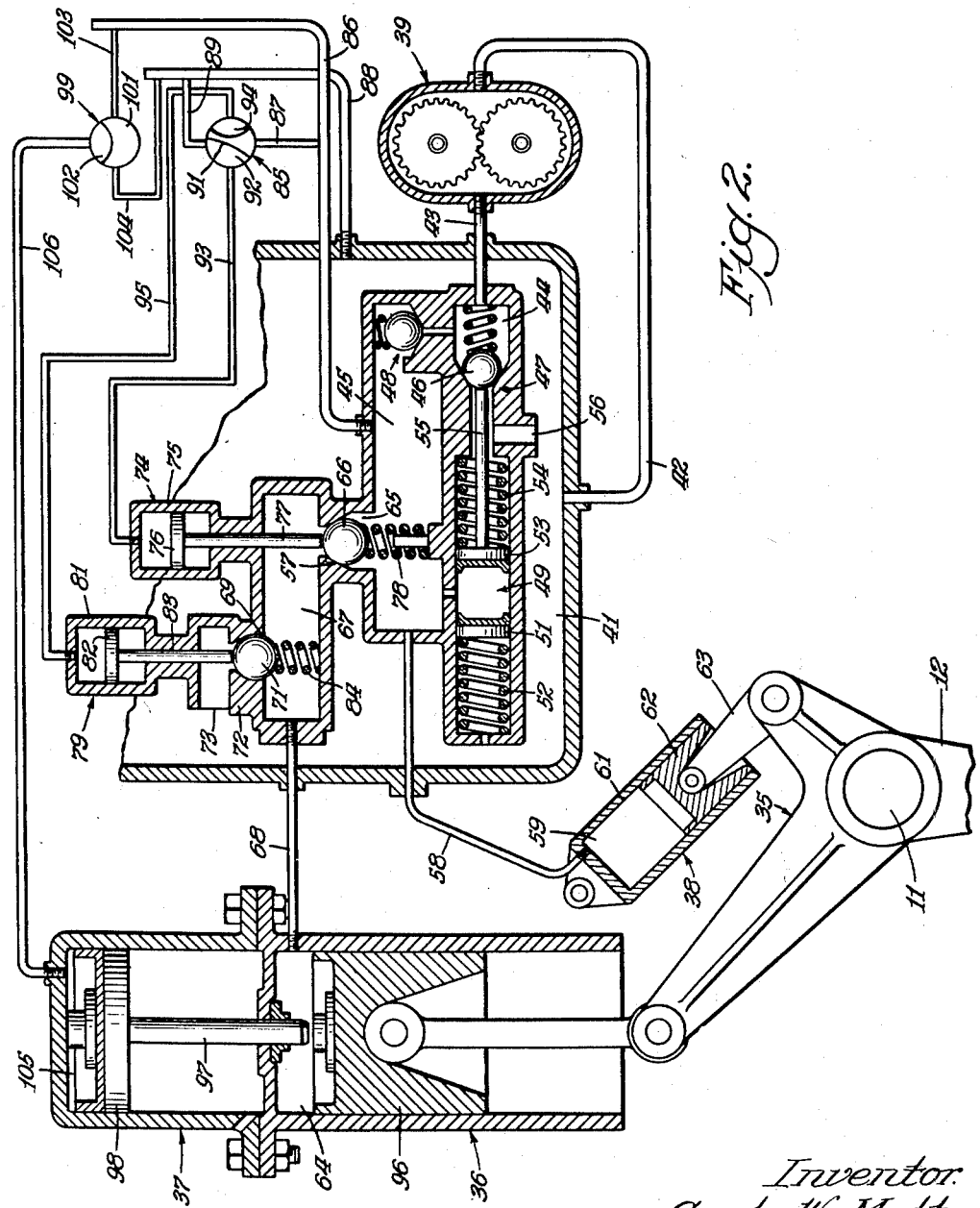
Fig. 2 is a diagrammatic view of the auxiliary power transmitting system of Fig. 1 with parts of the units included in the system broken away or shown in section for exposing internal movable elements.

The pump 39 draws fluid, preferably oil, from the bottom of a reservoir 41 through a conduit 42 and expels this fluid through a conduit 43 into a vestibule 44 of an accumulator 45. When the ball 46 of a pressure relief valve 47 is seated as shown in Fig. 2, the fluid flows from the vestibule 44 past the ball of a check valve 48 into the main chamber of the accumulator 45. As the pressure builds up in the accumulator, that part of the fluid in a supplementary chamber 49 displaces a wall portion 51 of the chamber while compressing and storing energy in a spring 52. Upon the pressure attaining a predetermined maximum, a piston 53 will be forced sufficiently to the right against the effort of a spring 54 to project a stem 55 against the ball 46 for unseating the same and thereby opening the pressure limiting valve 47 and permitting by-pass of the fluid from the pump through the vestibule 44 and outwardly of a passage 56 into the reservoir. Thus, the pump is permitted to operate under a low pressure condition while check valves 48 and 57 prevent escape of the fluid at high pressure from the accumulator 45.

The energy stored in the spring 52 prior to the unseating of the ball 46 assures that the ball will be definitely unseated when the desired maximum pressure has been attained in the accumulator. The pressure in the accumulator vestibule 44 will be the greatest just as the maximum pressure is attained in the accumulator and when the spring 52 is compressed the farthest. As the pressure in the accumulator reaches this maximum and thereby causes the pressure acting upon the wafer-like piston 53 to prevail over the pressure acting upon the smaller area of the ball 46, the ball will commence to unseat, allowing some of the fluid to escape from the vestibule 44 past said ball and thereby causing a pressure drop in the vestibule. Immediately the ball 48 will seat, and the stored energy in the spring 52 then having the advantage of the diminished pressure in the vestibule 44 can unseat the ball 46 a considerable distance without any significant opposition.

A conduit 58 communicates between the accumulator 45 and an expansible chamber 59 formed within the upper portion of the ram-receiving bore 61 of the ram device 38. A plunger 62 of the ram 38 is operably connected with the pivotable structure including the bell-crank 35 by means of a connecting rod 63. The ram device 38 is auxiliary to the principal device 36 and supplements the weight of the tool rigs tending to rotate the pivotable structure clockwise. Conduit means for providing communication between the accumulator 45 and an expansible chamber 64 in the upper end of the cylinder bore of the ram 36 includes a passage 65 containing the seat for the ball 66 of the admittance check valve 57, a chamber 67, and a conduit 68. An exhaust conduit means for the ram chamber 64 includes the conduit 68, said chamber 67, a passage 69, containing the seat for a ball 71 of an exhaust check valve 72, and a passage 73 communicative with the reservoir 41.

A small hydraulic motor 74 energizable to unseat the ball of the admittance check valve 57 includes a cylinder 75 and a piston 76 having a stem 77 projectible downwardly against the ball 66 when fluid is introduced into the cylinder above the piston 76. A spring 78 biases the ball 66 toward the seated position and thereby closes the admittance check valve upon the removal of fluid pressure above the piston 76.

A second small hydraulic motor 79 is used for opening the exhaust check valve 72. Motor 79 includes a cylinder 81, a piston 82, and a stem 83 which is forced downwardly with the piston for unseating the ball 71 when fluid under pressure is introduced into the upper part of the cylinder 81. A spring 84 restores the ball 71 to its seat when fluid pressure is relieved from the upper end of the motor cylinder 81.

Pressure fluid is selectively introduced into the upper ends of the motor cylinders 75 and 81 for energizing such motors by means of a manually operated control valve 85. Pressure fluid is supplied to the valve 85 through a conduit 86 and a lateral 87. A diametrically opposite side of the valve 85 is connected with the reservoir through a conduit 88 and a lateral 89. When the core 91 of valve 85 is rotated counter-clockwise from the neutral (shut off) position shown in Fig. 2, for bringing the cavity 92 in bridging relation with the conduit lateral 87 and a conduit 93, pressure fluid from the accumulator will flow through the valve and said conduit 93 into the upper end of the motor cylinder 75 for energizing the motor 74 and opening the admittance check valve 57. Concurrently a cavity 94 of valve core 91 will communicatively bridge the exhaust conduit 89 and a conduit 95 leading to the upper end of the motor cylinder 81 whereby this cylinder will be allowed to exhaust into the reservoir and the motor 79 de-energized to cause closing of the exhaust check valve 72. Consequently, fluid will flow past the opened check valve 57 and into the expansible chamber 64 of the ram 36, energizing this ram and causing its plunger 96 to move downwardly and rotate the pivotable structure including the bell-crank 35 counter-clockwise and thereby elevating the tool rigs 15 and 16. The valve core 91 is manually rotated by means of a handle 97, Fig. 1. So long as the valve core 91 is held in the just-described position, the ram plunger will continue to move downwardly and the tools to be elevated, it being possible to elevate the tools to a transport position.

When it is desired to stop the movement of the tools at a position of desired elevation, the valve core 91 will be rotated back to the neutral position shown in Fig. 2, causing the core cavity 92 to communicate between the conduits 93 and 89 for de-energizing the motor 74 whereby the admittance check valve 57 is closed and no further movement of the plunger 96 occurs. During the counter-clockwise pivoting of the bell-crank 35, the plunger 62 of the ram 38 will be moved upwardly while expelling fluid from the expansible chamber 59 through the conduit 58 into the accumulator 45. This occurs because of the bore of the ram 36 being greater than that of the ram 38 and also because of the ram 38 having a shorter lever arm on the bell-crank.

When it is desired to lower the tools, the valve core 91 will be rotated clockwise from the position shown in Fig. 2 for causing the cavity 94 to communicatively bridge the conduits 87 and 95 so that pressure fluid is introduced into the upper end of the motor cylinder 81. This opens the exhaust check valve 72 whereupon the force of gravity acting upon the tools and the force of pressure fluid in the auxiliary ram chamber 59 cause the bell-crank 55 to pivot clockwise as fluid is expelled from the principal ram chamber 64 through the conduit 68 and past the valve 72 to the reservoir. Movement of the valve core 91 back to the neutral position terminates communication between the fluid supply conduit 87 and the conduit 95 but does not establish communication between the conduit 95 and the exhaust conduit 87 so that fluid remains trapped in the upper end of the motor cylinder 81 retaining the exhaust check valve 72 open. Consequently, the plunger 96 continues to move upwardly and the tools to descend until the plunger abuts against the lower end of the stem portion 97 of a plunger 98 in the ram device 37. The plunger stem 97 serves as a stop and determines a selectable limit for the descent of the tools. The position of the stop ram plunger 98 is controlled by a valve 99 having a rotatable core 101 containing an arcuate cavity 102. A pressure fluid conduit 103 connects with one side of the valve 99 while an exhaust lateral 104 from the conduit 88 connects with the opposite side of the valve. With the valve core 101 in the neutral position of Fig. 2, no entry or exhaust of fluid with respect to the expansible chamber 105 in the upper end of the stop ram 37 can occur. Rotation of the valve core 101 clockwise, however, will bring the cavity 102 into bridging communication with the conduit 103 and a conduit 106 whereby fluid flows through the valve and the conduit 106 into the chamber 105 for forcing the plunger 98 downwardly. Since the bore of the ram 37 is of the same diameter as that of the ram 36, should the lower end of the stem 97 be bearing upon the upper end of the plunger 96, the stop ram will be as effective as the principal ram 36 for rotating the bell-crank 35 counter-clockwise and raising the tools. Thus, the position of the stop plunger stem 97 for determining a depth limit for the tools can be effected while the tools are in the ground and without necessarily energizing the principal ram 36. When the desired adjustment has been made, the valve core 101 is rotated back to the neutral and setting of the stop plunger 98 remains fixed.

When it is desired to adjust the stop plunger 98 for correspondingly increasing the depth limit of the tools, the valve core 101 will be rotated counter-clockwise from the neutral for placing the cavity 102 in communication between the conduits 106 and 104 to permit the exhaust of fluid from the stop ram chamber 105 concurrently with the rotation of the valve core 91 clockwise for bringing the cavity 94 into communication between the conduits 87 and 95 so that the motor 79 will be energized for opening the valve 92 and permitting the exhaust of fluid from the principal ram chamber 64 under the influence of the constantly energized auxiliary ram and the weight of the tools.

While the apparatus is in this condition, that is, with the exhaust check valve 72 open and the valves 85 and 99 in the neutral position, rotation of the bell-crank 35 in either direction is attainable under control of the valve 99. If, for instance, the core of valve 99 is rotated clockwise from the neutral so that the conduit 103 communicates with the conduit 106, fluid will be introduced into the expansible chamber 105 of the stop ram 37 and thereby force the plungers 98 and 96 downwardly for rotating the bell-crank counter-clockwise. Meanwhile, the auxiliary ram plunger 62 is forced upwardly and caused to force fluid into the accumulator 45. The capacity of the accumulator for receiving this fluid is increased by displacement of the wafer-like piston 51 while compressing the spring 48. This operation has the effect of lifting the tillage tools on the tractor. If on the other hand the core of valve 99 were to be rotated counter-clockwise from the neutral for connecting the conduit 106 with the exhaust conduit 104, the pressure of fluid in the auxiliary ram chamber 59 together with the force developed by gravity upon the tool rigs would be sufficient for rotating the bell-crank 35 clockwise as the tools descend, forcing the ram plungers 96 and 98 upwardly to a point determinable by the closing of the valve 99. During such upward movement of the ram plungers 96 and 98, the fluid in the principal ram device chamber 64 is discharged back to the reservoir through the conduit 68 and past the then opened valve 72. Normally the valve 99 will be manipulated for controlling relatively short movements of the ram plungers 98 and 96 while the tools are in the ground, that is, whereby the stop plunger assembly 98—97 serves as a variable stop for controlling the depth of the tillage tools. Lifting of the tools to the transport position will be accomplished by rotating the core of valve 85 counter-clockwise from the neutral for exhausting the valve motor 79 and energizing the valve motor 74 so that fluid from the accumulator flows past the admittance check valve 57 into the principal ram device chamber 64. This manipulation of the valve 85 enables the adjustable stop plungers 98—97 to remain at a predetermined depth so that upon subsequent rotation of the core of the valve 85 into clockwise position from the neutral for allowing the tools to descend will cause the valve operating motor 74 to be de-energized and the motor 79 to be energized. Motor 79 will remain energized when the core of valve 83 is returned to neutral whereby the plunger 96 of the principal ram device 36 will continue its upward movement until abutting the ram stop stem 97. Following this, depth adjustment of the tools in either direction is possible by manipulation solely of the valve 99 as explained above.

Having thus described the preferred embodiment of the invention with the view of clearly illustrating the same, I claim:

1. In a hydraulic system for controlling the position of a pivotal structure, a constant delivery pump, a reservoir from which fluid is supplied to the pump, an accumulator into which the pump delivers the fluid at high pressure, a pressure-limiting valve sensitive to the pressure in the accumulator and through which excess fluid delivered by the pump spills into the reservoir at low pressure while such valve is open, a principal ram device operably connected with said structure, the bore in said device having a portion constituting a chamber expansible by the introduction of fluid thereinto incident to advancing the plunger of such device for pivoting said structure in one direction, an auxiliary ram device also operably connected with said pivotal structure, the bore of said auxiliary device having a portion constituting a chamber expansible by the introduction of fluid thereinto for advancing its plunger pursuant to pivoting said structure in the opposite direction, conduit means connecting the chamber of said auxiliary device communicatively with the accumulator, conduit means for communication between the chamber of the principal device and the accumulator, an admittance check valve in said conduit means of the principal device and including a member seatable in the direction of flow from the accumulator to the principal device chamber for closing such valve but being unseatable in the opposite direction for establishing communication between the accumulator and the principal device chamber, exhaust conduit means for communication between the principal device chamber and the reservoir, an exhaust check valve in the exhaust conduit means and seatable in the direction of exhaust flow to prevent such flow but unseatable to accommodate such flow, hydraulic motors respectively associated with said seatable valve members and each being energizable when subjected to a pressure differential for unseating its associated valve member, control valve means communicatively disposable between said motors, said reservoir and said accumulator and being operable to selectively energize said motors by subjecting one of the same to the pressure of fluid in the accumulator while the other of the motors is de-energized by being made communicative with the reservoir, the relative bores of said ram devices being such that the principal device prevails over the auxiliary device and causes pivoting of said structure in the one direction when the admittance check valve is open, whereas the auxiliary device is operable for pivoting the structure in the opposite direction when the admittance check valve is closed and the exhaust check valve is open, a stop ram device of which the plunger is reciprocatable in parallelism with that of the principal device and has a portion projecting into the chamber of the principal device for abutment with its plunger to limit retractive movement thereof in contracting the principal device's chamber, the bore of the stop ram device also having a portion constituting a chamber expansible by the introduction of fluid thereinto for projecting the plunger portion farther into the principal device's chamber, and means for establishing communication of the stop device chamber selectively with said accumulator and said reservoir, and the relative bores of the stop and auxiliary devices being such that the stop device, when its plunger portion is projected against the principal device plunger, prevails over the auxiliary device and causes advancement of the principal device plunger in establishing a desired retraction limit, although the auxiliary device is operable for pivoting the structure in the opposite direction and thereby retracting the plungers of the other two devices when their chambers are communicating with the reservoir.

2. In a hydraulic system for controlling the position of a pivotal structure, a principal ram device operably connected with the said structure and expansible by the introduction of fluid into a portion of the bore thereof constituting an expansion chamber for advancing the ram plunger and thereby pivoting said structure in one direction, a stop ram device of which the plunger thereof is reciprocable in parallelism with that of the principal device and has a portion projecting into the chamber of the principal device for abutment with its plunger to limit retractive movement thereof during contraction of the principal device's chamber, the bore of the stop ram device also having a portion constituting a chamber expansible by the introduction of fluid thereinto for projecting the plunger portion farther into the principal device's chamber, both of said plungers being retractive under the influence of force tending to pivot said structure in the opposite direction when fluid is exhausted from the expansible chambers of said devices, a fluid source having relatively high and low pressure sections, conduit means for communication between the chamber of the principal device and said high pressure section, an admittance check valve in said conduit means and including a member seatable in the direction of flow from said high pressure section to said chamber for closing said valve but being unseatable in the opposite direction for establishing communication between said high pressure section and said chamber, exhaust conduit means for communication between the principal device's chamber and the low pressure section of said source, an exhaust check valve in the exhaust conduit means and seatable in the direction of exhaust flow to prevent such flow but unseatable to accommodate such flow, hydraulic motors respectively associated with said seatable valve members and each being energizable when subjected to a pressure differential for unseating its associated valve member, and a control valve for establishing alternative communication between said motors and the high and low pressure sections of said source pursuant to adjustment thereof in respectively opposite directions from a neutral position, said valve being operable while in neutral to establish communication from the low pressure section to the admittance valve motor for de-energizing the same and thereby causing closure of said admittance valve, said control valve being operable when adjusted in one position from the neutral to establish communication between the high pressure section of the source and the admittance check valve motor for opening the same and causing fluid delivery for advancing the plunger of the principal ram concurrently with incurring communication between the exhaust check valve motor and the low pressure section of said source for de-energizing this motor and incurring closure of the exhaust check valve, said control valve being operable when adjusted in the opposite direction from neutral for maintaining communication between the admittance valve motor and the low pressure section of said source and for establishing communication between the high pressure section of said source and the exhaust check valve motor to cause exhaust of fluid from the principal ram chamber and retraction of the principal ram plunger under the influence of said force for pivoting the pivotable structure in the opposite direction, and a second control valve connected between the stop ram chamber and said source, the second control valve having a neutral position wherein it causes isolation of the stop ram chamber and being adjustable in opposite directions from the neutral position for respectively communicatively connecting the stop ram chamber with the high and low pressure sections of said source.

CARL W. MOTT.

REFERENCES CITED

The following references are of record in the file of this patent:

UNITED STATES PATENTS

| Number | Name | Date |
| --- | --- | --- |
| 354,020 | Morey | Dec. 7, 1886 |
| 845,949 | Harrison | Mar. 5, 1907 |
| 1,187,861 | Rembold | June 20, 1916 |
| 1,476,703 | Forman | Dec. 11, 1923 |
| 1,589,384 | Grigoleit | June 22, 1926 |
| 1,863,448 | Landenberger et al. | June 14, 1932 |
| 2,244,420 | Dinzl | June 3, 1941 |
| 2,365,148 | Clark | Dec. 12, 1944 |
| 2,381,923 | Obtresal | Aug. 14, 1945 |
| 2,430,597 | Acton | Nov. 11, 1947 |